J. W. Yothers,
Bedstead Fastening,
No. 13,736. Patented Oct. 30, 1855.
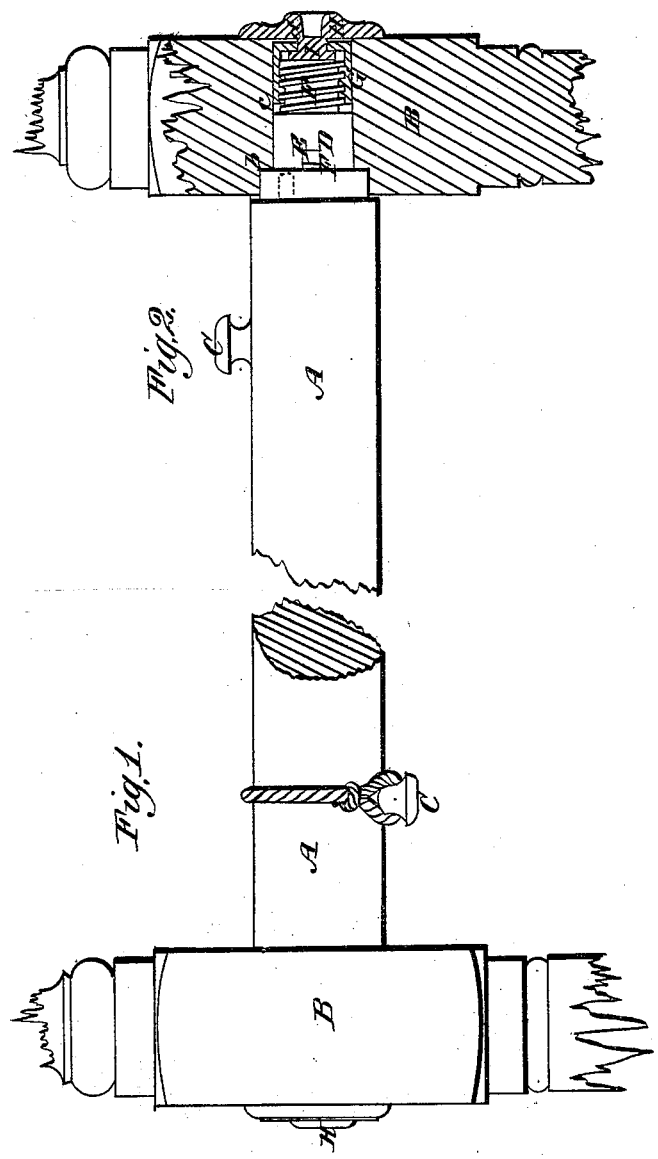

UNITED STATES PATENT OFFICE.

JOHN W. YOTHERS, OF SPRUCE GROVE, PENNSYLVANIA.

BEDSTEAD-FASTENING.

Specification of Letters Patent No. 13,736, dated October 30, 1855.

*To all whom it may concern:*

Be it known that I, JOHN W. YOTHERS, of Spruce Grove, in the county of Monroe and State of Pennsylvania, have invented a new and Improved Bedstead-Fastening; and I do hereby declare that the following is a full, clear, and exact description of the same, reference being had to the annexed drawings, making a part of this specification, in which—

Figure 1 is a view of a bedstead post with a rail attached to it by my improved fastening. Fig. 2, is the same view as Fig. 1, with the exception of the post which is bisected vertically through its center. Fig. 3, is a view of one end of a rail showing the screw and collar thereon. Fig. 4, is an end view of the female screw, which is connected to the cap on the outer side of the post.

Similar letters of reference indicate corresponding parts in the several figures.

The nature of my invention consists in securing the rails to the posts—when the rails are provided with right and left screws at their extremities—by means of tubular segmental nuts G, and buttons H, arranged in such a manner that by turning the said buttons the rails can be secured with their knobs in any desired position, and by the act of thus securing the rails, the buttons themselves will be drawn so closely against the sides of the posts as to form perfectly tight and insect proof joints between them and the posts, substantially as herein after set forth.

To enable others skilled in the art to fully understand and construct my invention, I will proceed to describe it.

A Figs. 1, 2 and 3, represents the rail of the bedstead having at each end a collar D upon the outer end of which a screw thread F is cut, see Figs. 1 and 3. The collar D is kept firmly secured to the rail by a key E which passes transversely through the collar and rail and bears against a metal strip E' which also passes through the collar and rail. The collar is prevented from turning upon the rail by flanches (*a*) which fit into the rail, see dotted lines Fig. 3, said flanches being on the inner side of the collar. The collar D is not of an equal thickness or diameter throughout but has a shoulder at (*b*) and one at (*c*) as shown in Figs. 2 and 3, and the portion of the collar having the greatest diameter as at (*b*) is somewhat smaller in diameter than the rail A. A circular hole or aperture is made through the post B of a size to receive the collar D, the portion of the hole at the inner side of the post being larger in diameter than the other portion to receive the shoulder (*b*).

G Figs. 2 and 4 is a nut or female screw, divided longitudinally into two parts and having a recess (*d*) cut in the outer end of each part as shown clearly in Fig. 4, the two recesses when the two parts are together forming an oblong slot. The opposite ends of the two parts of the nut or female screw are entirely open.

H is a cap formed of a circular or other proper shaped piece of metal, and having in its outer surface a rectangular recess (*e*) to receive a wrench, see Fig. 1. On the inner surface of the cap H there is a button I which fits within the recess (*d*) as shown in Fig. 2 and connects the nut or female screw G to the cap H.

The collar D is placed in the hole or aperture in the post B and the nut or female screw inserted in the outer or opposite end of the hole or aperture and the cap H turned with a proper wrench and the rail A will be properly secured to the post.

The above invention is simple and effective and the rails may be secured in any proper position so as to bring the knobs C on the rails at the desired point to tighten or strain the mattress. Some bedstead fastenings are merely formed by cutting a right and left screw on the ends of the rails, said screws working in nuts in the posts, the rails being secured to the posts by turning the rails. This method is attended with difficulty for the knobs may not come at the desired point when the rails are fully screwed up, besides the ends of the rail must be entered into the posts at the same time precisely, or else one post will be screwed up to the rail before the other. My improvement obviates these difficulties.

Having thus described my invention what I claim and desire to secure by Letters Patent, in connection with the screw collars or tenons on the ends of the rails, is—

The combination of the tubular segmental nuts G, and the buttons H, with each other and with the posts B, in such a manner that by turning the said buttons, the rails A, can be secured with their knobs in any desired position, and by the act of thus securing the rails, the buttons themselves will be drawn so closely against the outer surfaces of the posts as to make perfectly tight and insect proof joints between the buttons and the posts, substantially as herein set forth.

JOHN W. YOTHERS.

Witnesses:
JOSEPH MAYER,
THOMAS M. MCILHENEY.